United States Patent [19]
Kirstein

[11] Patent Number: 5,890,760
[45] Date of Patent: Apr. 6, 1999

[54] BICYCLE SEAT CUSHION

[76] Inventor: Brigitte Kirstein, 2111 Rue Favard, Montréal, Québec, Canada, H3K 1Z6

[21] Appl. No.: 775,751

[22] Filed: Dec. 31, 1996

[51] Int. Cl.[6] .................................................. A47C 31/00
[52] U.S. Cl. .................................. 297/219.11; 297/195.1; 297/202; 297/214; 297/228.12; 297/DIG. 6
[58] Field of Search .................. 297/219.11, 228.12, 297/195.1, 214, DIG. 6, 202

[56] References Cited

U.S. PATENT DOCUMENTS

| | | | |
|---|---|---|---|
| 562,919 | 6/1896 | Sager | 297/219.11 X |
| 594,316 | 11/1897 | Basch | 297/214 X |
| 1,271,375 | 7/1918 | Saunders | 297/219.11 X |
| 1,991,751 | 2/1935 | Kennedy | 297/219.11 X |
| 2,613,722 | 10/1952 | Ruppert | 297/219.11 |
| 3,807,793 | 4/1974 | Jacobs | 297/214 |
| 3,997,214 | 12/1976 | Jacobs | 297/214 |
| 4,218,090 | 8/1980 | Hoffacker et al. | 297/214 |
| 4,451,083 | 5/1984 | Marchello | 297/219.11 |
| 4,786,104 | 11/1988 | Fellenbaum | 297/219.11 X |
| 5,348,369 | 9/1994 | Yu | 297/195.1 X |
| 5,356,205 | 10/1994 | Calvert et al. | 297/214 X |
| 5,388,887 | 2/1995 | Read | 297/214 X |
| 5,397,162 | 3/1995 | Huang | 297/219.11 X |

FOREIGN PATENT DOCUMENTS

| | | | |
|---|---|---|---|
| 136244 | 1/1934 | Austria | 297/219.11 |
| 176109 | 4/1917 | Canada | 297/219.11 |
| 414114 | 8/1910 | France | 297/219.11 |
| 609788 | 8/1926 | France | 297/219.11 |
| 58078 | 9/1953 | France | 297/219.11 |
| 814250 | 9/1951 | Germany | 297/219.11 |
| 163167 | 10/1933 | Switzerland | 297/219.11 |
| 180847 | 4/1936 | Switzerland | 297/219.11 |
| 24362 | of 1895 | United Kingdom | 297/202 |
| 5361 | of 1899 | United Kingdom | 297/219.11 |
| 23962 | of 1910 | United Kingdom | 297/219.11 |
| 170657 | 10/1921 | United Kingdom | 297/219.11 |

*Primary Examiner*—Peter M. Cuomo
*Assistant Examiner*—Rodney B White

[57] ABSTRACT

A bicycle seat cushion that has a relatively thick, main cushioning base with a foam material interior and a protective outer cover. The base has a narrow, pentagonal arrow shape when viewed from the top with the pointed portion at the front. The cushion includes a secondary cushioning base carrying a pair of spaced apart, relatively thin, firm, cushioning pads. The secondary base is detachably connected to the bottom of the main base. The position of the secondary base is adjustable longitudinally relative to the main base. The main base cushions the rider's buttocks while the two cushioning pads provide additional cushioning for the rider's pelvic bones.

13 Claims, 3 Drawing Sheets

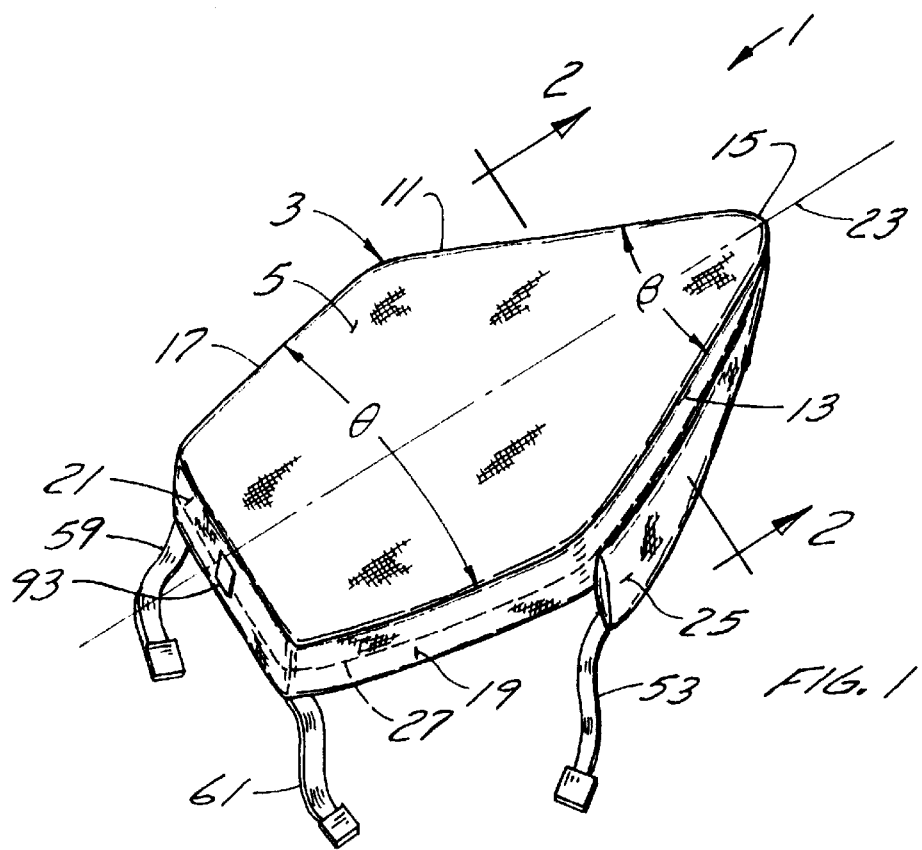
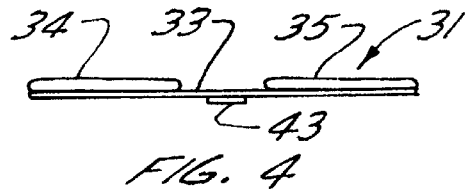
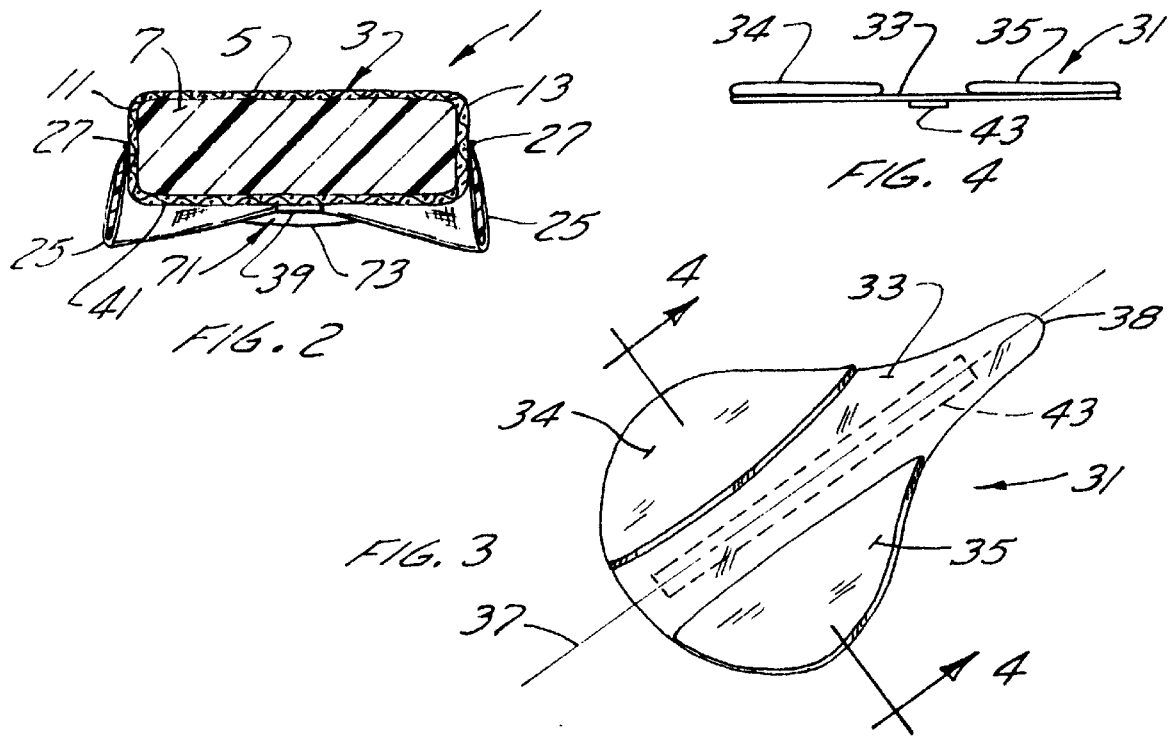
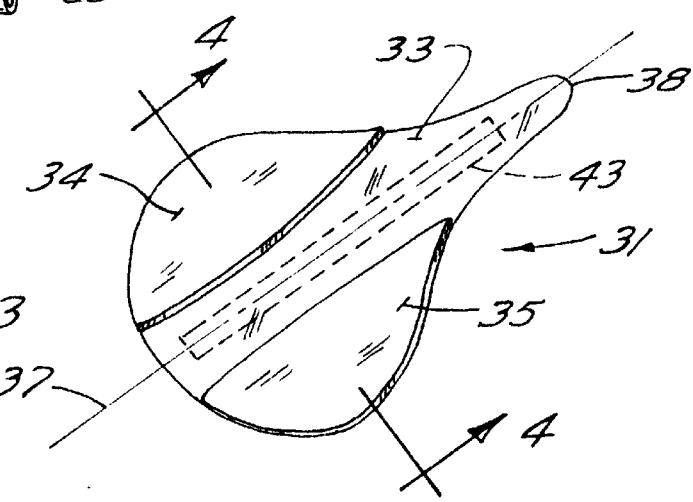

BICYCLE SEAT CUSHION

BACKGROUND OF THE INVENTION

1. Field of the Invention

This invention is directed toward an improved bicycle seat cushion.

2. Description of the Related Art Including Information Disclosed Under CFR §§ 1.97–1.99

Bicycle seat cushions are known. However the known cushions are not designed to fit different sizes or shapes of seats. Further, the known cushions are not as comfortable as one would expect them to be particularly with regard to cushioning a person's pelvic bones. Also the known cushions are not adjustable to fit people of different size or with different riding styles. Further, the known cushions are difficult to mount so that they stay in place on the seat.

SUMMARY OF THE INVENTION

It is the purpose of the present invention to provide an improved bicycle seat cushion that can fit nearly all bicycle seats, including exercise bicycle seats; that is extremely comfortable, especially on long rides; that is particularly suited for cushioning a person's pelvic bones; that is adjustable to be able to cushion pelvic bones of people of different size or with different riding styles; and that is easy to put on and take off, with the cushion staying in place when it is on.

In accordance with the present invention, there is provided a seat cushion having a relatively thick, main cushioning base. The base comprises foam material enclosed in a fabric cover. The base has a pointed front portion defined by two front sides that diverge from each other from the front end of the base. A rear side extends from the back of each of the front sides, the rear sides slightly converging. The ends of the rear sides are joined by a transverse back side. The overall shape of the base, when viewed from the top, is of a narrow, pentagonal, arrow shape with the front and rear sides being about the same length and with the back side being slightly shorter than the front and rear sides. The pointed front portion of the cushion allows the rider's legs clearance relative to the cushion while riding and the tapered rear portion of the cushion permits it to fit on a wide or narrow seat and on everything in between.

Fastening means are provided for detachably fastening the cushion to a bicycle seat. The fastening means includes a pocket formed at the bottom front of the main base, the pocket opening rearwardly. The pocket slips over the front end of the bicycle seat to hold the front end of the cushion on the seat and to center it with respect to the seat. Fastening straps are provided on the bottom of the main base adjacent the rear corners and the side corners where the front and rear sides meet. The straps at diagonally opposite corners connect together under a bicycle seat to hold the cushion on the seat. Alternatively, on very wide seats, the straps on the same sides of the main base are connected together to hold the cushion on the seat.

The seat cushion has a secondary cushioning base. The secondary base comprises a generally tear-dropped shaped, flexible sheet with a pair of relatively firm, thin cushioning pads on the sheet. The pads on the sheet are on either side of the longitudinal center of the sheet and are spaced rearwardly from the narrow, front end of the sheet. Connecting means detachably connect the secondary base to the bottom of the main base. The connecting means are such that the secondary base can be adjusted longitudinally on the main base to position the pads longitudinally relative to the main base in the best cushioning position for the rider when the cushion is mounted on a seat. The pads extend past the sides of the main base when the secondary base is mounted on the main base and are located to provide support for the rider's pelvic bones when the cushion is mounted on a seat.

The invention is particularly directed toward a seat cushion for a bicycle seat, the cushion having a relatively thick, main cushioning base. The base comprises foam material enclosed in a protective cover. The base has a pointed front portion defined by two front sides that diverge from each other from the front end of the base. Two rear sides extend rearwardly from the backs of the front sides, the rear sides slightly converging. The ends of the rear sides are joined by a transverse back side. The base, when viewed from the top has a narrow, pentagonal, arrow shape. Fastening means are provided for use in detachably fastening the cushion to the top of a bicycle seat.

The seat cushion includes a secondary cushioning base having a generally tear drop shaped, flexible sheet. A pair of spaced-apart, relatively thin, firm, cushioning pads are mounted on the sheet. The pads on the sheet are on either side of the longitudinal center of the base and are spaced from the front end of the sheet. Connecting means detachably connect the secondary base to the bottom of the main base.

BRIEF DESCRIPTION OF THE DRAWINGS

FIG. 1 is a top perspective view of the main cushioning base of the cushion;

FIG. 2 is a cross-section view taken along line 2—2 of FIG. 1;

FIG. 3 is bottom perspective view of the secondary cushioning base of the cushion;

FIG. 4 is a cross-section view taken along line 4—4 of FIG. 3;

DESCRIPTION OF THE PREFERRED EMBODIMENTS

Figure 5:
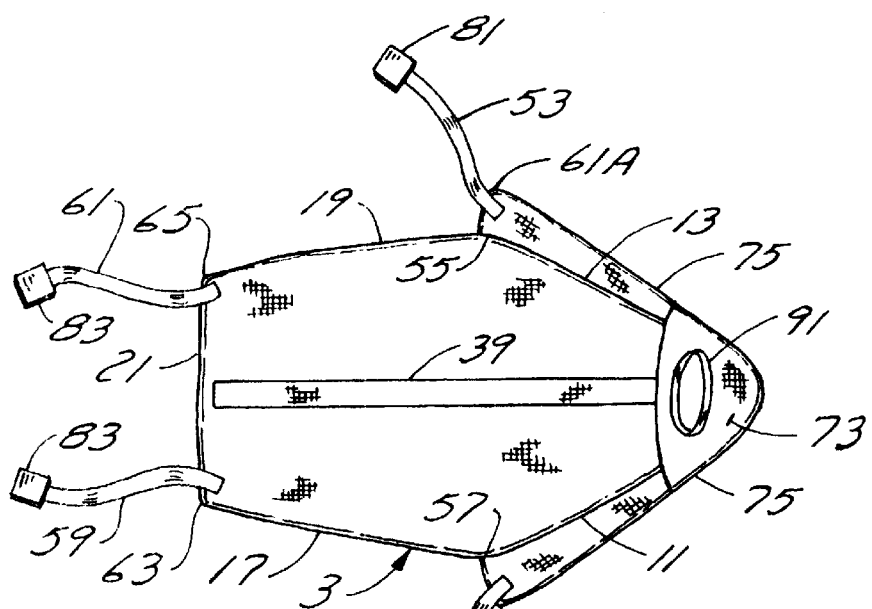
FIG. 5 is a bottom view of the main base.

The cushion 1, as shown in FIGS. 1 and 2, has a relatively thick, main cushioning base 3 comprised of a protective cover 5 enclosing cushioning material 7. The cover 5 preferably is fabric. The cushioning material 7 can comprise a single cut piece of synthetic foam material or a plurality of pieces of synthetic foam material stuffed into the cover 5 which, when full, gives the base 3 its narrow, pentagonal shape. The base 3 has a pair of front sides 11, 13 diverging away from the pointed front end 15 of the base. The included angle β between the sides is about 45°. A rear side 17, 19 extends rearwardly from the end of each front side 11, 13. The rear sides 17, 19 slightly converge with the included angle φ between them being about 25°. A back side 21, extending transverse to the longitudinal center line 23 of the base 3, joins the rear ends of the back sides 17, 19 together.

The front and back sides 11, 13 and 17, 19 are about the same length and slightly longer than the length of the back side 21. The base 3, when viewed from the top, has somewhat of an arrow shape. When viewed from the side, the front portion of the base 3 tapers slightly toward the front end 15.

The main cushioning base 3 has a relatively thin, tapered, padded flap 25 extending downwardly from each front side 11, 13. Each flap 25 is secured to the cover 5 at a seam 27 (shown in dotted lines) that extends generally along the middle of the front, rear and back sides 11, 13, 17, 19, 21. The flap 25 tapers toward the front end of the cushioning base 3.

The cushion 1 has a secondary cushioning base 31. The secondary cushioning base 31, as shown in FIGS. 3 and 4, has a generally tear drop shaped, flexible sheet 33 with a pair of relatively thin, firm, cushioning pads 34, 35 mounted on the sheet 31 on either side of its longitudinal center line 37. The pads 34, 35 are spaced rearwardly of the narrow front, end 38 of the sheet 33. The pads can be made from a closed cell polyethylene foam.

Connecting means are provided for detachably connecting the secondary base 31 to the bottom of the main base 3. The connecting means comprise a first strip 39 of one of hook or eye type fastening material fastened to the bottom 41 of the main base 3 along its longitudinal center line 23. The connecting means includes a second strip 43 of the other of the hook or eye type fastening material fastened to the top of the sheet 33 of the secondary cushioning base 31 between the pads 33, 35. The second strip 43 is shorter than the first strip 39. The secondary base 31 is attached to the main base 3 by aligning the second strip 43 on the secondary base 31 with the first strip 39 on the main base 3 and pressing the strips together. The position of the secondary base 31 can be adjusted longitudinally relative to the main base 3 to locate the pads 34, 35 in the proper position for the rider using the cushion. Other types of connecting means, allowing for longitudinal adjustability, can be used.

Fastening means are provided for fastening the cushion to a seat. The fastening means, as shown in FIG. 5, includes a pair of front straps 51, 53 in the vicinity of the front corners 55, 57 of the main base 3 where the front sides 11, 13 meet the rear sides 17, 19. Actually, the front straps 51, 53 are preferably attached to the bottom rear, corners 59A, 61a of the flaps 25 just below the corners 55, 57. The fastening means also includes a pair of rear straps 59, 61 fastened to the bottom of the cover adjacent the rear corners 63, 65 of the main base 3 where the rear sides 17, 19 meet the back side 21. The fastening means also includes a front pocket 71 on the bottom of the main base 3. The pocket 71 opens rearwardly and is formed by a piece of fabric 73 stitched across the front portions of the bottom edges 75 of the flaps 25. Other types of fastening means can be used.

Figure 6:
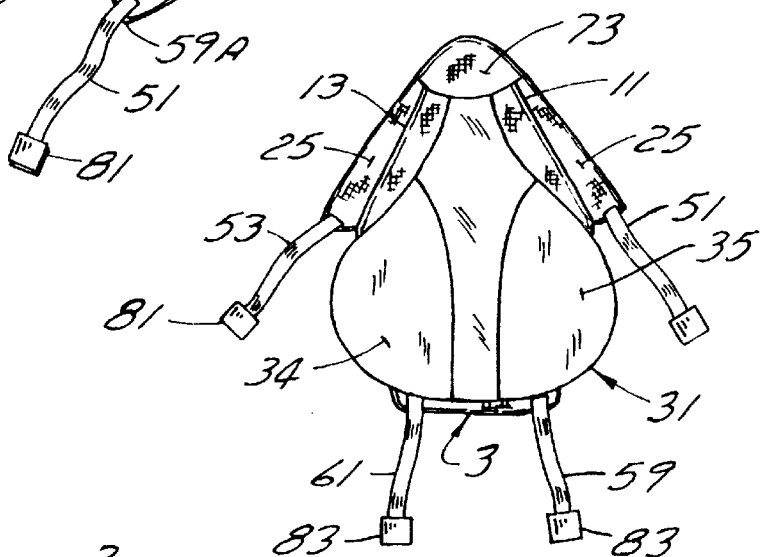
FIG. 6 is a bottom view of the cushion with the secondary base connected to the main base.
Figure 7:
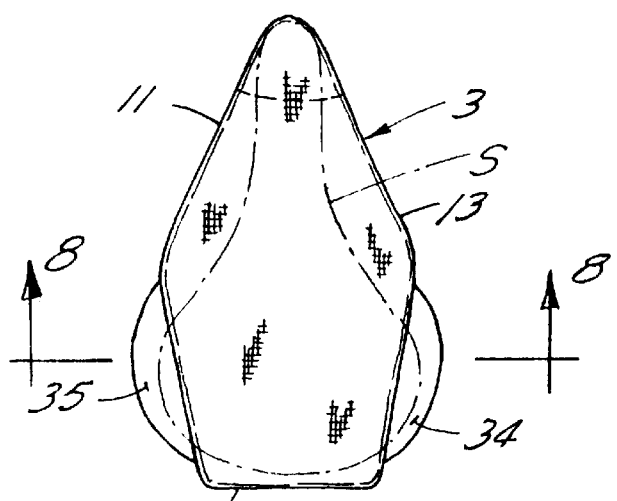
FIG. 7 is a top view of the cushion mounted on a narrow seat.
Figure 8:
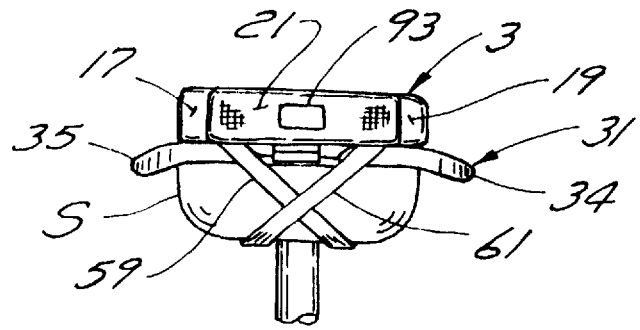
FIG. 8 is a cross-section view taken along line 8—8 of FIG. 7.
Figure 9:
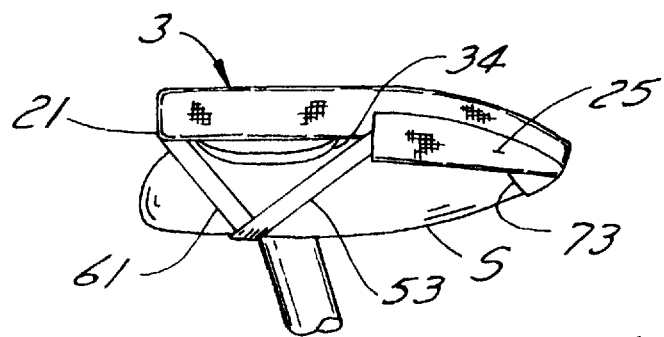
FIG. 9 is a side view of the cushion mounted on the seat.

In use, the secondary cushioning base 31 is attached to the bottom of the main cushioning base 3 by the hook and eye strips 39, 43 at the desired longitudinal position on the main base as shown in FIG. 6. The assembled cushion 1 is then mounted on a bicycle seat, as shown in FIGS. 7 to 9, with the pocket 71 slipped over the nose of the seat S. The fastening straps are connected together in criss-cross fashion under the seat S with one front strap 51 attached diagonally to one rear strap 61 and the other front strap 53 attached diagonally to the other rear strap 59. Suitable known cooperating fastening means 81, 83 on the ends of the straps allow the straps 51, 61 and 53, 59 connect together. At least one of the fastening means 81, 83 is adjustably connected to its strap. This allows the straps to be tightened on the seat to securely hold the cushion on the seat. The flexible sheet 33 is preferably made of a non-slip material such as that sold by Manco Inc. of Westlake, Ohio under the trademark "Easy Liner".

In the mounted position, the thin cushioning pads 34, 35 project slightly past the back sides 17, 19 of the main cushioning base 3 and are in position to provide support for the rider's pelvic bones. The rider's thighs do not interfere with the cushion because of the tapered front portion. In addition, the padded flaps 25, extending down the front side of the seat, provide additional cushioning for the thighs. The slightly tapered rear portion of the main cushioning base 3 is found to provide comfortable cushioning for the buttocks of the rider.

Figure 10:
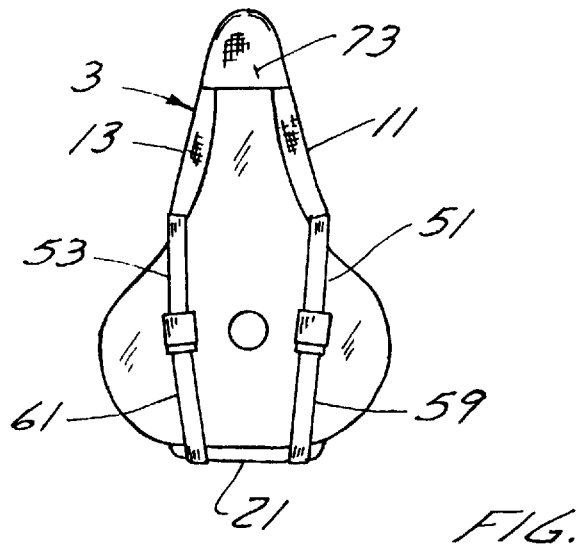
FIG. 10 is a bottom view of the cushion mounted on a wide seat.

On a wide seat, the fastening straps 51, 59 on one side of the cushion can be connected together and the fastening straps 53, 61 on the other side can also be connected together as shown in FIG. 10.

The cushion 1 can be provided with a loop 91 of elastic material under the pocket 71 as shown in FIG. 5. The loop 91 can be detachably attached to the fabric piece 73 forming the pocket 71 with strips of hook and eye material on both the loop and fabric piece or with other suitable attaching means. The loop 91 could also be permanently attached to the fabric piece. The loop 91 is used when using the cushion on a seat of an exercise bicycle which seat has a large front end.

The cushion can also be provided with a patch 93 of hook or eye fastening material on the back side 21 of the main base 3 as shown in FIG. 1. An accessory, such as a reflector, having a similar patch of complimentary hook or eye material, could be fastened on the patch 93.

I claim:
1. A bicycle seat cushion having:
   a relatively thick, main cushioning base, the main cushioning base having:
      a cushion material interior and a protective outer cover; and fastening means on the base for use in detachably fastening the main cushioning base to the top of a bicycle seat;
   a separate, relatively thin, secondary cushioning base having:
      a flexible sheet; a pair of relatively thin, firm, cushioning pads on the sheet, the pads spaced apart on either side of the longitudinal center of the sheet;
   and cooperating connecting means on the main cushioning base and on the secondary cushioning base for selectively, detachably connecting them together with the main cushioning base on top of the secondary cushioning base and with the pair of cushioning pads toward the a rear end back of the main cushioning base.

2. A bicycle seat cushion as claimed in claim 1 wherein the cooperating connecting means are on the bottom of the main cushioning base and the top of the secondary cushioning base.

3. A bicycle seat cushion as claimed in claim 2 wherein the cooperating connecting means are of the type allowing the longitudinal position of the secondary cushioning base, and the pads carried by the secondary cushioning base, to be adjusted relative to the main cushioning base.

4. A bicycle seat cushion as claimed in claim 3 wherein the cooperating connecting means comprise: a first elongated fabric strip of one of hook and loop fastening material on the bottom of the main cushioning base along its longitudinal, central line; and a second fabric piece of the other of the hook and loop fastening material on the top of the sheet along its longitudinal, central line for attachment to the elongated strip anywhere along its length.

5. A cushion as claimed in claim 2 wherein the bottom surface of the flexible sheet is made of non-slip material.

6. A bicycle seat cushion as claimed in claim 2 wherein the base has five sides, a top, and a bottom with two of the sides diverging from a pointed front end of the base; the sides defining a base having a narrow, pentaganal, arrow shape when viewed from the top.

7. A bicycle seat cushion as claimed in claim 1 wherein the cooperating connecting means are of the type allowing the longitudinal position of the secondary cushioning base, and the pads carried by the secondary cushioning base, to be adjusted relative to the main cushioning base.

8. A bicycle seat cushion as claimed in claim 7 wherein the cooperating connecting means comprise: a first, elongated, fabric strip of one of hook and loop fastening material on the bottom of the main cushioning base along its longitudinal, central line; and a second fabric piece of the other of the hook and loop fastening material on the top of the sheet along its longitudinal, central line for attachment to the elongated strip anywhere along its length.

9. A bicycle seat cushion as claimed in claim 7 wherein the base has five sides, a top, and a bottom with two of the sides diverging from a pointed front end of the base; the sides defining a base having a narrow, pentaganal, arrow shape when viewed from the top.

10. A cushion as claimed in claim 1 wherein the bottom surface of the flexible sheet is made of non-slip material.

11. A bicycle seat cushion as claimed in claim 1 wherein the base has five sides, a top, and a bottom with two of the sides diverging from a pointed front end of the base; the sides defining a base having a narrow, pentaganal, arrow shape when viewed from the top.

12. A bicycle seat cushion as claimed in claim 11 including a thinly padded flap attached to each of the two diverging sides, the flaps extending downwardly below the main cushioning base to cushion the inner thighs of a bicycle rider against the bicycle seat when the cushion is mounted on the seat.

13. A bicycle seat cushion having:

a relatively thick, main cushioning base, the main cushioning base having:

a cushion material interior and a protective outer cover; the base having five sides, a top, and a bottom with two of the sides diverging from a pointed front end of the base; the sides defining a base having a narrow, pentagonal, arrow shape when viewed from the top; a thinly padded flap attached to each of the two diverging sides, and fastening means on the base, including the flaps, for use in detachably fastening the main cushioning base to the top of the bicycle seat, the flaps extending downwardly below the main cushioning base to cushion the inner thighs of a bicycle rider against the bicycle seat when the cushion is mounted on the seat.

* * * * *